Figure 1:
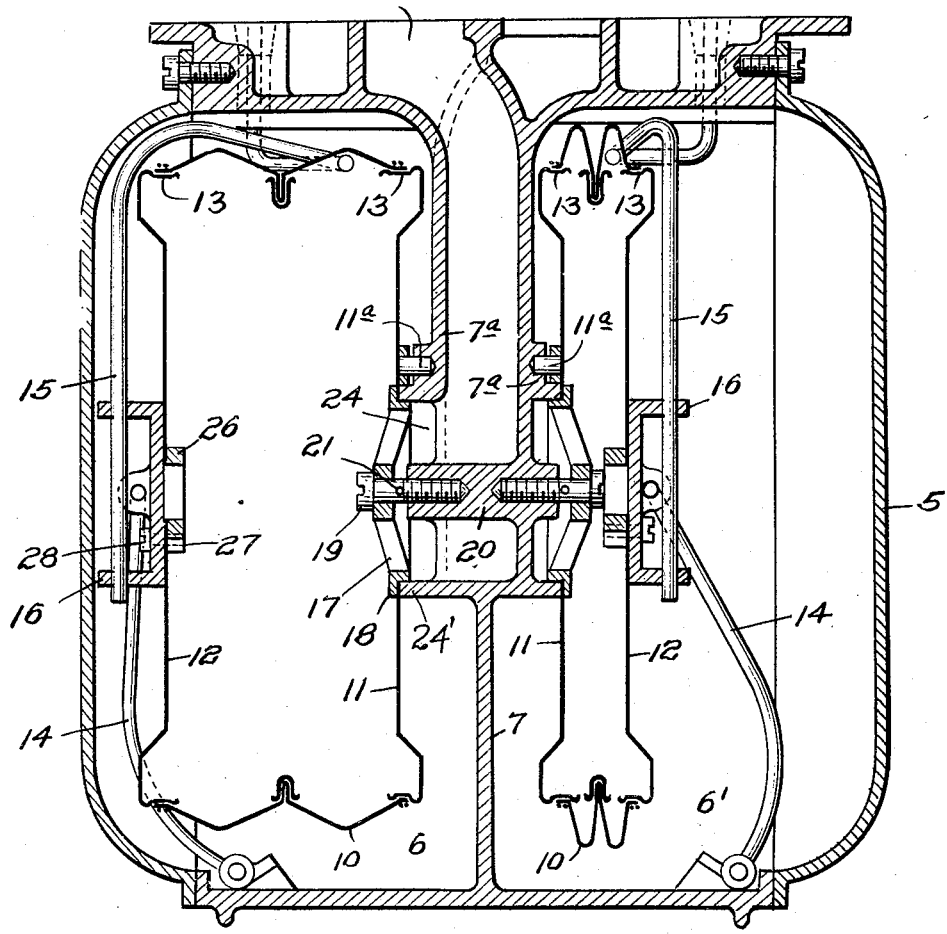

Oct. 28, 1930.  H. CHRISMAN  1,779,901
GAS METER
Filed June 15, 1923   2 Sheets-Sheet 1

WITNESS
F. Herbert Bradley.

INVENTOR
Horace Chrisman
by Green McCallister
Attorneys

Oct. 28, 1930.  H. CHRISMAN  1,779,901
GAS METER
Filed June 15, 1923   2 Sheets-Sheet 2

WITNESS

INVENTOR
Horace Chrisman

Patented Oct. 28, 1930

1,779,901

UNITED STATES PATENT OFFICE

HORACE CHRISMAN, OF EDGEWOOD, PENNSYLVANIA, ASSIGNOR, BY MESNE ASSIGNMENTS, TO PITTSBURGH EQUITABLE METER COMPANY, OF PITTSBURGH, PENNSYLVANIA, A CORPORATION OF PENNSYLVANIA

GAS METER

Application filed June 15, 1923. Serial No. 645,543.

This invention relates to gas meters and has for an object to produce a meter simpler in construction and more durable in operation than meters now in use and known to me.

A further object is to produce an improved meter which is of simple construction, easy to assemble and disassemble and accurate and durable in operation.

A further object is to produce an improved gas meter which is relatively cheap to build, simple to assemble and which is smaller for a given capacity than similar meters now in use and known to me.

These and other objects, which will be made more apparent through the further description of the invention, are attained by means of apparatus embodying the features here described and illustrated in the drawings accompanying and forming a part hereof.

Figure 2:
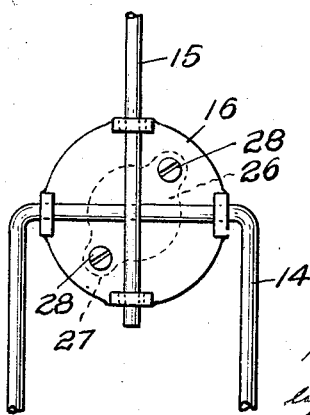
Figure 3:
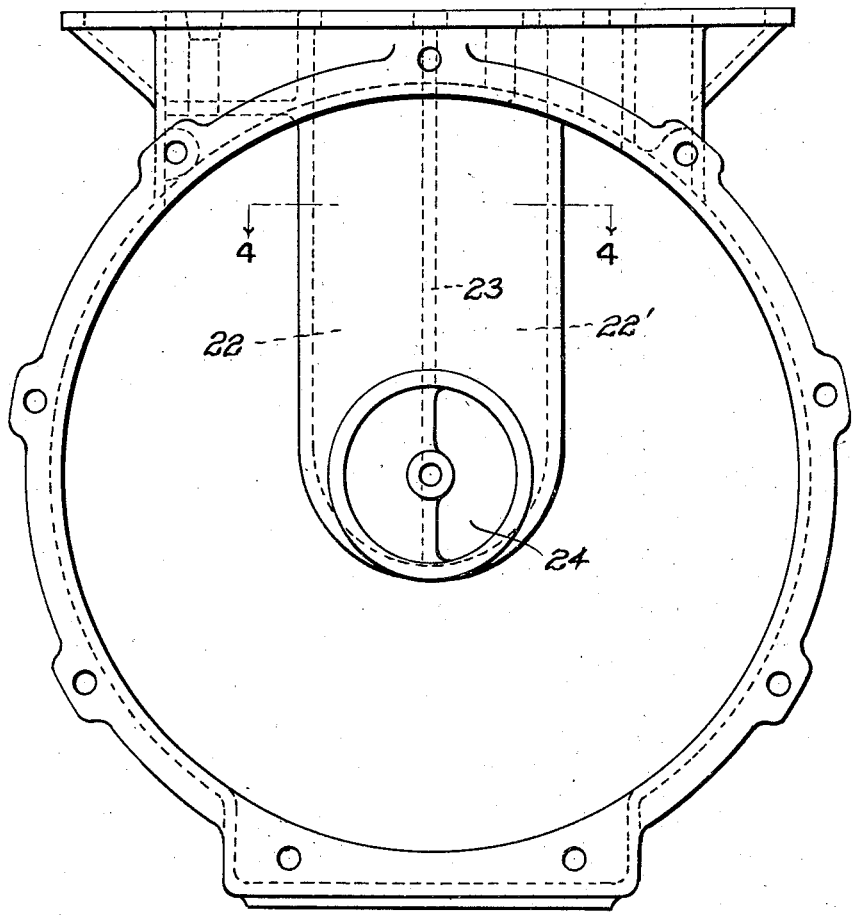
Figure 4:
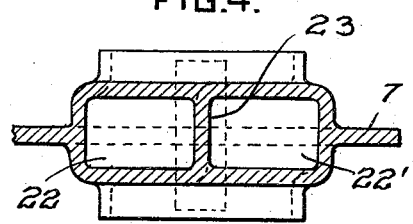

In the drawings, Figure 1 is a transverse vertical section of a meter embodying my invention, Fig. 2 is a fragmental view of a detail of my invention, Fig. 3 is a view of the meter illustrated in Fig. 1, as it appears with a side cover and a diaphragm removed, and Fig. 4 is a fragmental sectional view in the line 4—4 of Fig. 3.

As illustrated, the meter includes a casing 5, which is provided with the usual gas passages. As shown the casing is divided into two metering chambers 6 and 6' by a centrally located partition wall 7. As is customary, a bellows diaphragm 10 is located in each chamber and is provided with diaphragm heads 11 and 12.

A feature of my invention resides in these diaphragm heads and the means employed for securing the bellows or diaphragm thereto. The diaphragms 10 are of the usual construction, each being so formed that, with its associated heads, it encloses a substantially cylindrical chamber.

Heretofore, it has been the usual practice to solder a metal ring to the outer edge of each head, to which the bellows is secured. This procedure is objectionable because of the cost of the soldering operation and also because the soldered joints are likely to leak, either because of faulty workmanship or because of strains and attendant wear occasioned by the operation of the apparatus.

With my invention I eliminate these difficulties by forming an integral annular flange 13 at the outer edge of each diaphragm head. This may be accomplished by stamping, spinning, or otherwise forming each head with an integral flange thereon.

Each flange 13 is of such shape and is so located with relation to the head on which it is formed, that the annular bellows or diaphragm is secured thereto in the manner heretofore employed in connection with the separate rings to which I have referred.

The diaphragm with the heads attached are located in the meter chambers and, as is usual, one head of each diaphragm is secured to the partition wall 7, whereas the other head is secured to a guide wire 14 and to flag wire 15. The guide wire is pivotally mounted on the casing 5 in the usual manner and is secured in the usual manner to a guide wire carriage 16, with which the head is provided.

Another feature of my invention is the means employed for securing the diaphragm heads 11 to the partition wall 7 of the casing. As is usual this partition wall is provided with gas passages and ports so arranged that each port is adapted to communicate with one of the measuring chambers enclosed by one of the bellows diaphragms and its associated heads. It is also usual pracice to provide each diaphragm head 11 with a centrally located port which is adapted to communicate with a casing port formed in the partition wall 7, in such a way as to form a gas-tight joint between the diaphragm and the edges of the casing port. Heretofore, the diaphragm heads 11 have been secured to the partition by means of spiders which are not only separately formed, but are also detached from the diaphragm heads until the spiders are secured in place on the partition wall, at which time they clamp the diaphragm head in position on the partition.

This arrangement of apparatus is objectionable since it makes the operation of securing the diaphragm in place on the partition a difficult one, and it also renders the operation of disassembling the apparatus for the purpose of repairs, a very difficult operation. In carrying out my invention I rigidly secure spider 17 to the diaphragm head. This may be accomplished by soldering the outwardly projecting circumferential flange 18 of the spider to the inner edge of the head in such a way that the spider in effect forms the integral part of the head and encircles the port formed therein. With such an arrangement the diaphragm head 11 and the spider are secured to the partition wall 7 as a unit, thus obviating the difficulty encountered in separately positioning the head and in separately securing the spider in place on the partition and in clamped relation with the head.

As illustrated the spider 17 is secured in place on the wall 7 by means of a screw 19, which engages a tapped aperture formed in a boss 20 of the wall, thereby forcing the circumferential flange 18, with the head attached, into contact with the circular flange 24'. The operation of inserting this screw through the spider and of screwing it into the apertured boss is difficult, particularly where the diaphragm and its heads are assembled prior to installation in the meter casing. It is also a difficult operation to remove the screw 19, in case it is necessary to remove the assembled diaphragm for the purpose of repairs, since the screw is likely to drop into the measuring chamber enclosed by the diaphragm, and occasion some difficulty in being recovered. To obviate these difficulties I secure the screw to the spider, but in such a way that it is capable of being turned freely for the purpose of screwing it into the receiving aperture formed in the boss 20 of wall 7. As illustrated the shank of each screw is threaded throughout a part of its length and is provided with a transversally extending aperture 21, at a point intermediate the head and the screw threaded portion. A pin, similar to a cotter pin, is inserted through this transverse aperture after the screw has been inserted through the screw receiving aperture formed in the spider. This holds the screw loosely but permanently in place in the spider and the screw 19, the spider 17, and the diaphragm head 11 are not only assembled as a unity, but they are secured to the partition 7 as a unit and there is no chance of the screw dropping out and giving difficulty during the operation of assembling or disassembling the meter.

The diaphragm heads 11, are each provided with the usual centering or positioning pins 11ᵃ, which engage corresponding apertures formed in centering or positioning bosses 7ᵃ formed on the partition wall.

Ordinarily the gas passages of the partition wall 7 are superimposed, one on the other and are separated by means of a partition which extends in the same direction as the partition wall 7. This construction increases the depth of the meter by at least the width of one such passage, and also increases the cost of construction, due to the coring operation. I am able to reduce the size of the meter and also reduce the liability of leakage by locating the gas passages of the partition wall side by side so that they are separated by a web or partition which extends at right angles to the general direction of the partition wall 7. As illustrated in Figs. 1 and 4, the partition wall 7 is provided with two passages 22 and 22', located side by side, with relation to the wall and separated one from the other by means of an intermediate web or partition 23 which extends at right angles to the general plane of the wall 7. This results in a material saving in overall depth of the meter casing and otherwise simplifies the construction. It also simplifies the coring operation and reduces the liability of producing bad or porous casting.

As shown the passage 22 terminates in a port 24, which communicates through one of the spiders 17 with one of the measuring chambers enclosed by a diaphragm and its associate heads. The other passage 22' is provided with a port which communicates with the other diaphragm enclosed measuring chamber and which is oppositely disposed with relation to the port 24. In the usual construction these oppositely disposed ports are aligned with each other. With the construction illustrated the ports are preferably semi-circular as shown in Fig. 3 and are staggered with relation to each other. Each of these semi-circular ports is provided around its circumferential edge with a flange 24', which is continued to form a circular flange or shoulder as shown in Fig. 3, and on which the co-operating spider 17 is seated, as shown in Fig. 1. This arrangement provides central and uniform distribution of the gas to and from each of the measuring chambers, and also simplifies the construction.

Another feature of my invention is the means employed for securing the flag wire carriage 16 in place on each head 12. As illustrated each head is provided with an annular nut 26, which is soldered or otherwise rigidly secured to the head so that it encircles a central aperture formed therein. As shown in dotted lines in Fig. 2 each nut 26 is provided with outwardly extending lugs 27 which are provided with tapped bolt receiving apertures adapted to receive carriage holding bolts 28. These bolts pass through the carriage, and the head and are screwed into the nut. As shown the lugs 27 are so situated that they straddle the plane of the flag wire 15, with the result that easy access is provided to the bolts 28 on either side of the flag wire.

The operation of the meter embodying my invention is the same as that of the old meter of the same type. The flag wires control the operation of the metering valves so that gas is alternately directed to each measuring chamber, enclosed by the diaphragms and each measuring chamber formed within the casing 5 and located exterior of the diaphragms. Gas is first delivered to the interior chamber through the communication passage 22, and then is discharged from that chamber through the same passage, movements of the diaphragm being guided by the associate guide wire 14. The meter is of course provided with the usual valve and registering mechanism and the casing is provided with the usual cover plates to facilitate assembling and disassembling of the entire meter.

While I have described but one embodiment of my invention it will be apparent that various changes, additions, modifications and omissions may be made in the apparatus illustrated without departing from the spirit and scope of my invention as set forth by the appended claims.

What I claim is:—

1. In combination in a meter, a casing having a gas port formed therein, a bellows diaphragm located in said casing, a diaphragm head secured to said bellows and having a port formed therein, a spider permanently secured to said head and spanning said port, and means for securing said spider to said casing in register with said casing port.

2. In combination in a gas meter, a meter casing having a gas port formed therein, a diaphragm bellows located in said casing, a diaphragm head secured to said bellows and having a port formed therein, and means including a spider permanently secured to said head for securing said head to said casing with the port of said head in register with the port of said casing, and attaching means carried by said spider for securing said spider and its associated diaphragm head to said casing.

3. In combination in a gas meter, a meter casing having a gas-delivery port formed therein, a diaphragm bellows located in said casing, a diaphragm head secured to said bellows and having a gas-delivery port formed therein, a spider rigidly secured to said diaphragm head and spanning said port formed therein, and a screw loosely secured to said spider for securing said spider to said casing and in register with said casing port.

4. In combination in a gas meter, a casing having a meter chamber formed therein, a bellows diaphragm located in said chamber, a diaphragm head secured to said diaphragm, a nut soldered to said head and having bolt receiving lugs formed thereon, a flag wire carriage, bolts screwed into said nut for securing said carriage to said head, and a flag wire engaged by said carriage, said lugs being so located on said nut as to provide free access to said bolts on either side of said flag wire.

5. In combination in a meter, a meter casing, a partition wall extending transversely thereof and dividing the interior of the casing into two metering chambers, and provided with two gas passages located side by side and separated by a web extending at right angles to said wall, each of said passages terminating in a port communicating respectively with one of said chambers, said ports being arranged in staggered relation, and on opposite sides of said wall.

6. In combination in a meter, a meter casing, a partition wall extending transversely thereof and dividing the interior of the casing into two chambers and provided with two gas passages located side by side and separated by a partition extending at right angles to said partition wall, said partition wall having two separate gas delivery ports therein, each port communicating respectively with one of the passages.

7. In combination in a gas meter, a meter casing, a partition wall extending across said casing and dividing the interior thereof into two chambers and having two gas passages formed therein and located side by side with relation to the plane of said wall and each terminating in a separate port, said ports being located on opposite sides of said wall and each being offset with relation to the other, a separate bellows located in each chamber, a separate head secured to each bellows and having a port formed therein, and means for securing said heads to opposite sides of said wall with their ports aligned and each in register with one of said offset ports of said partition wall.

8. In combination in a gas meter, a meter casing, a partition extending across the casing and dividing the interior thereof into two metering chambers, a bellows located in each chamber, a separate diaphragm head secured to each bellows and having a port formed therein, said partition being formed to provide two gas passages located side by side and a separate gas port on each side of said partition each communicating with a separate one of said passages, said ports being offset one to the other but so that the axis of the combined ports is coaxial with the axes of the ports in said diaphragm heads, and means permanently secured to each diaphragm and bridging the port formed therein, for securing each diaphragm to the partition so that the ports thereof are in axial relation one with the other and each is in register with one of said partition ports.

9. In combination in a meter, a meter casing, a partition wall extending transversely thereof and dividing the interior thereof into two metering chambers, said partition wall being formed to provide gas passages located side by side, each terminating in a separate port communicating respectively with one of said chambers, and a web formed on said wall extending at right angles to the plane of separation of said chambers and intervening between said passages.

10. In combination, a meter casing, a partition extending transversely thereof and dividing the interior of said casing into two metering chambers, said partition being formed to provide a gas passage for each chamber and an enlarged port extending laterally from each passage into one of said chambers, a dividing web extending transverse of said partition separating said passages and extending across said ports, the walls of said ports being arranged in substantial alignment, a bellows diaphragm in each chamber having a head provided with a port in substantial alignment with said first named ports, and means carried by each head and held in assembled relation therewith for securing each head to said web with its port in registry with one of said first named ports.

11. In combination, a meter casing, a partition extending transversely thereof and dividing the interior of said casing into two metering chambers and formed to provide two passages arranged side by side and enlarged outlet ports for said passages extending in opposite directions to said chambers, said ports having walls arranged in substantial alignment, a web separating said passages and said ports, a separate bellows diaphragm located in each of said chambers, a diaphragm head secured to each diaphragm having a port formed therein, each head being arranged with its port in registry with one of said first named ports, a member permanently secured to each head and bridging the port therein, and means held in assembled relation to said member for securing said head to said web with its port in substantial alignment with one of said first named ports.

12. In combination, a meter casing, a wall dividing said casing into a plurality of metering chambers, a separate bellows diaphragm in each chamber having a head provided with a port, the ports in adjacent chambers facing each other, said casing being provided with a pair of passages disposed side by side in the wall separating said chamber and a pair of ports communicating with said head ports the surrounding walls of the casing and head ports being substantially in alignment, a dividing wall separating said casing ports so that each is in communication with one of said passages, and means held normally in assembled relation to each head for securing said diaphragm to said wall with its port in registry with a casing port.

13. In combination in a gas meter, a meter casing, a partition extending across said casing and dividing the interior thereof into two metering chambers, and having two gas passages formed therein and located side by side with relation to the plane of said partition, and each terminating in a separate port formed in said partition, said ports being located in staggered relation and on opposite sides of said partition, coaxial circular flanges formed on opposite sides of said partition, each surrounding one of said ports, a bellows mounted in each chamber, a separate diaphragm head secured to each bellows and having a central circular port formed therein, a separate spider on each head and bridging said port formed therein, and means for securing said heads to said partition with said spiders in engagement with said circular flanges, said head ports in alignment one with the other and each in direct communication with an offset port of said partition.

In testimony whereof, I have hereunto subscribed my name this 12th day of June, 1923.

HORACE CHRISMAN.